(No Model.)
J. A. ALEXANDER.
ADJUSTABLE TRACE FASTENING.
No. 332,861. Patented Dec. 22, 1885.
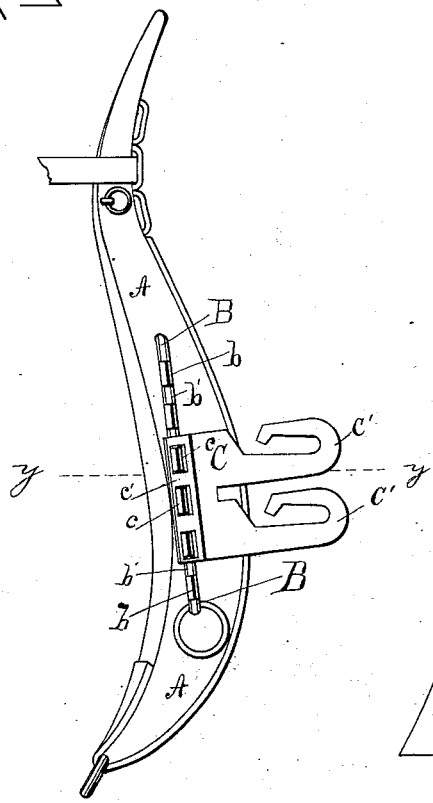
Fig. I.
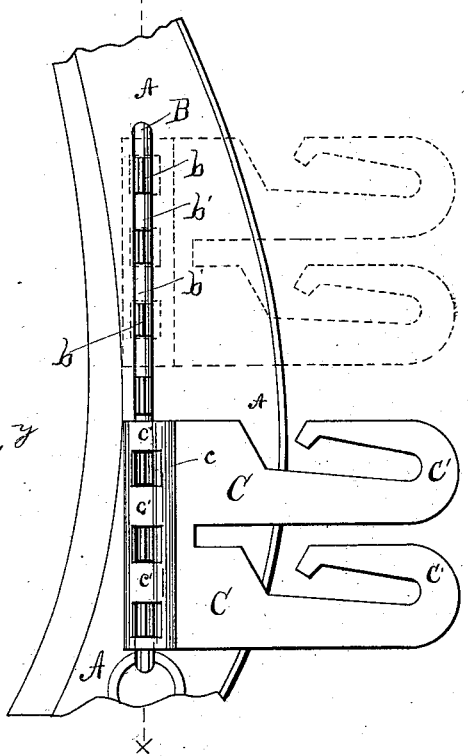
Fig. II.
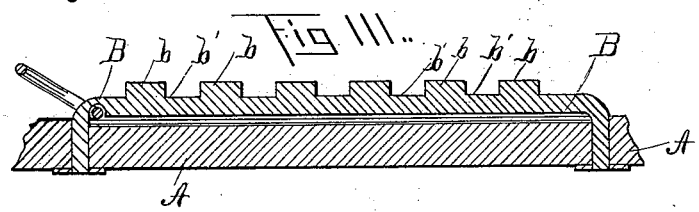
Fig. III.
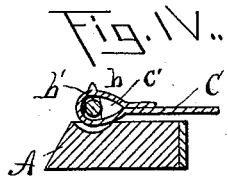
Fig. IV.
Witnesses:
W. Pell Pulig.
W. C. Orcutt
Inventor.
Julius A. Alexander
By Richardson
Attorneys.

UNITED STATES PATENT OFFICE.

JULIUS A. ALEXANDER, OF MONTICELLO, ARKANSAS.

ADJUSTABLE TRACE-FASTENING.

SPECIFICATION forming part of Letters Patent No. 332,861, dated December 22, 1885.

Application filed April 27, 1885. Serial No. 163,627. (No model.)

*To all whom it may concern:*

Be it known that I, JULIUS A. ALEXANDER, a citizen of the United States, residing in Monticello, in the county of Drew and State of Arkansas, have invented a new and useful Improvement in Adjustable Trace-Fastenings; and I hereby declare the following to be a full and clear description thereof.

This invention has for its object the construction of a metallic coupling for attaching the trace of a horse's harness to the hame, so as to adjust the position of the trace vertically on the hame, thereby rendering the draft of the trace easier on the animal by fitting the position of the trace and the line of strain just in the proper position on the animal, and adapting the harness to animals of different sizes or of different build or form.

The invention will be readily understood by reference to the accompanying drawings, of which Figure I is a front elevation of a hame fitted with my improved adjustable fastening. Fig. II is an enlarged elevational view of that part of the hame having the trace-fastening attached to it, and showing the said fastening in full lines in its lowest position, and in dotted lines in its highest position. Fig. III is a sectional elevation of the hame, taken on the line $x\ x$ of Fig. 2, and showing in elevation the adjusting-bar, the trace-fastening removed therefrom, and the notches on the bar by which the vertical adjustment is effected. Fig. IV is a transverse section of the coupling-bar and tug-plate, taken on the line $y\ y$ of Fig. I.

The hame A has a metallic adjusting-bar, B, secured to it so that the said bar lies parallel with and slightly removed from the front face of the hame, as is clearly shown in Fig. III, and, as is also therein shown, the ends of the said bar are turned back, passed through and riveted to or otherwise thoroughly secured to the hame-piece. To the front face of the said adjusting-bar B there are secured lugs $b$, or the bar is formed with such lugs upon it and projecting from its face, the said lugs being separated by intervening spaces $b'$, the said lugs and spaces alternating for a part or the whole of the length of the free or unattached part of the bar B.

A tug-plate or coupling-piece, C, is arranged to surround and couple with the said bar B in the form of a socket, and the socketed part of this coupling-piece has alternate slots $c$ and loops $c'$, adapted to fit on or into the lugs $b$ or recesses $b'$, as the case may be. The lugs $b$ project from one side of the bar B in an A shape, as shown in Fig. IV, and the loops $c'$ are similarly shaped, as is also shown in Fig. IV. When it is desired to move the tug or coupling-piece C up or down, it is first turned or partly rotated about the bar B, so as to allow the pointed outwardly-projecting lugs $b$ to pass through the corresponding part of the loops $c'$, and in this position the tug-plate or coupling-piece C can easily be adjusted to a higher or lower position on the hame, and then turned around in the position for use, in which last-named position the lugs $b$ fall into the recesses or slots $c$, and the recessed parts $b'$ of the said bar B receive the lugs $b$, and so parts of B and C readily fit the one to the other, and the trace attachment C is readily adjusted to and held in any required position, up or down, to best suit the proper line of traction for any particular animal or collar. At the outer end of the sliding tug or coupling plate C there is formed one or more hooks, C', for the attachment of the trace.

Having thus described my invention, what I claim as new, and desire to secure by Letters Patent, is—

In an improved hame and trace coupling, the staple-formed bar B, provided with lugs, as $b$, said bar being adapted to be riveted to the hame, in combination with the plate C, constructed with alternate looped portions, as $c'$, and recesses or slots, as $c$, said plate being hinged to said bar, and provided with a series of connecting-hooks at different heights, all substantially as shown and set forth.

In witness whereof I have hereunto set my hand this 4th day of April, 1885.

JULIUS A. ALEXANDER.

In presence of—
JOHN GRIGGS McKENNEY,
GEORGE D. STEDMAN.